United States Patent Office 3,446,652
Patented May 27, 1969

3,446,652
CHLORINATED OXETANE POLYMER COATING
Lester W. Smith, 136 Park Blvd., Berwick, Pa. 18603
No Drawing. Filed May 11, 1964, Ser. No. 366,614
Int. Cl. B44d 1/16, 1/44; B05c 7/02
U.S. Cl. 117—75                    5 Claims

ABSTRACT OF THE DISCLOSURE

A coating composition adapted for application to the interior of large vessels and railway tank cars comprises a dispersion of a finely divided chlorinated polyether polymer in an aqueous medium including water, a surfactant, and an ester of a polyhydric alcohol such as ethylene glycol diacetate; the composition may also include a lower aliphatic alcohol and a water softener. The composition is applied by maintaining the surface of the material to be coated above about 50° F., spraying the composition onto the surface and then drying and curing at a temperature between about 400° and 450° F., followed by cooling the coating.

---

This invention relates to the protective coating of metal surfaces with chlorinated polymers. More particularly, the invention concerns a novel chlorinated polyether dispersion, and the methods of preparing it and of applying it to metals.

The protection of metal surfaces against corrosion and abrasion by materials and against mechanical injury by tools and other articles by which they are contacted is a problem of long standing in the process industries and in the transportation field. In industrial plants it is necessary to protect the surfaces, and particularly the interior surfaces, of storage and processing tanks, piping, ducts, pumps, meters, and other equipment, against these influences. A similar need for protection is found in manufacture and utilization of containers and tank cars for the transportation of solid and liquid commodities, such as chemicals, fats, oils, powders, food products, and the like. In both industry and transportation, the aim has been to provide a protective coating which would be resistant to a broad spectrum of materials, and which would at the same time withstand elevated temperatures, and present a smooth and dependably adherent film on the metal. This goal is of special importance in the tank car field, for in the mass transportation of materials, considerations of economy demand the use of large vessels, whether of tank car size or of less-than-carload dimensions. Since a broad range coating material has not heretofore been available in a form which would fully meet the requirements of corrosion and abrasion resistance and also possess the necessary ease of application, adherence to the metal substrate, resistance to shock and vibration and long service life, it has been necessary to employ special metals or special coatings to meet each type of service requirement.

A class of compounds which is characterized by chemical inertness, and which can be applied as a thick continuous adherent film which is resistant to abrasion, thermal shock, and mechanical injury, is represented by the chlorinated polyether polymers. Typical of this class of polymers is poly [3,3-bis(chloromethyl)oxeane], which is sold commercially under the designation "Penton" by Hercules Powder Company, Wilmington, Delaware. These chlorinated polyether polymers are crystalline thermoplastic materials having a high chlorine content of about 45%, and a melting point above about 350° F., depending upon the degree of polymerization. The product known as Penton has a melting point of 375° F., and an average molecular weight between about 250,000 and 400,000.

Chlorinated polyether polymers are chemically inert and resistant to solvents at relatively high temperatures. In view of the small number of available solvents, such as, for example, cyclohexanone (all of which are such weak solvents that the solution produced is uneconomical and difficult to apply), it has been proposed to apply chlorinated polyether polymers as coatings by forming a suspension of fine particles of the polymer in an aqueous medium, applying the suspension to the metal, drying the suspension in place, and then fusing the resin to form a coating layer on the metal surface. In one coating system of this type, the resin is kept in suspension by means of a combination of a cationic flocculating agent, such as a long chain fatty amine and a binding agent, such as pectin or a starch derivative. However, in the known chlorinated polyether polymer coating systems, it has been difficult to obtain coatings of sufficient thicknesses and imperviousness to protect metal surfaces against corrosive agents for long periods of time.

In accordance with the invention, there are provided novel chlorinated polyether polymer dispersions which are characterized by ease of preparation and application, and a high degree of stability. The dispersions are capable of being applied to metal surfaces by conventional techniques, but are especially adapted to application by air spraying. The improved dispersions permit relatively thick coatings to be sprayed without running or sagging, they dry more readily in place on the metal surface, and after fusion they form continuous, strongly adherent, corrosion protecting films which possess long life, and which resist vibration and shock.

These characteristics are particularly significant in regard to the interior coating of large vessels and railway tank cars, which have not been coated successfully with chlorinated polyether polymers prior to the present invention.

The dispersion of the invention includes as its film forming component a chlorinated polyether polymer, which is selected so that its degree of polymerization and its melting point will assure the formation of a resinous film which will, upon curing, produce a hard, impervious, and adherent coating. The preferred chlorinated polyether polymer is that which is sold commercially under the designation "Penton," as previously indicated, but it is to be understood that while this polymer will be employed herein to illustrate the practice of the invention, the invention is not to be considered as limited thereto.

The chlorinated polyether polymer is employed in finely divided form, but the improved method of dispersion of the invention permits the use of the polymer in a less finely divided state than the minus 200 mesh particle size which has been characteristic of previously employed suspension producing methods. In the practice of the invention, the chlorinated polyether polymer is preferably utilized as a powder, the coarser particles of which all pass a U.S. Standard 60 mesh sieve, and the preponderance of which, namely preferably 60% or more, pass through a U.S. Standard 100 mesh sieve. It has been found, in accordance with the invention, that this particle size range facilitates the formation of stable dispersions employing the technique disclosed herein, but the particle size range is not to be regarded as critical, since finer sizes may be employed, if desired.

The chlorinated polyether polymer is available commercially in both the non-pigmented and pigmented forms, but for the purposes of the invention the non-pigmented form is preferred.

In accordance with the invention, there is employed as a dispersion medium, an aqueous vehicle including as its principal ingredients (a) a surfactant, (b) an alkaline water softener, (c) an ester of a polyhydric alcohol and (d) water.

These ingredients are blended until a homogeneous solution is obtained. The amount of the alkaline water softener is selected so that the pH of the resulting solution is at least 7, although with some hard waters the value may rise somewhat above this figure.

The dry, finely divided chlorinated polyether polymer is added to the foregoing solution with thorough mixing until a homogeneous dispersion is obtained. Usually a period of about 10 to 20 minutes is sufficient.

While the surfactant serves to deflocculate the polymer and to aid in its dispersion, it was found, in accordance with the invention, that its action is greatly enhanced by the inclusion of the polyhydric alcohol ester. Although the action of the latter is not fully understood, it appears to exert a plasticizing action on the polymer, and, in conjunction with the surfactant, produces a smoothly flowing dispersion, which is capable of being sprayed, and which exhibits extraordinary stability on standing. Thus, less than 1% separation occurs when the dispersion is stored for extended periods and this separation is a supernatant liquid rising to the top which can be readily incorporated in the dispersion. It is this greatly improved dispersion which enables the wet coated film when applied to the metal surface to maintain its integrity to an extent heretofore unobtainable with any known chlorinated polyether film applied from suspension.

Another novel feature of the invention lies in the addition to the chlorinated polyether dispersion, immediately prior to spraying, of a volatile, water soluble organic diluent, whereby the drying of the wet film is controlled and facilitated, permitting the attainment of a dry film thickness as high as 40 mils or more, in contrast with the coatings of from 5 to 20 mils obtainable by known methods. This represents an important technological advance in comparison with known processes, and, for the first time, it makes possible the successful application of this type of polymer as a single coat, with its attendant advantages, in the coating of large surfaces, such as those of storage tanks and the interior of railway tank cars.

In the practice of the invention, the organic diluent is blended with the aqueous dispersion prepared as previously described, and the resulting mixture is applied to the metal by spraying or other means.

The surfactant is advantageously an anionic type surfactant, of which there are several well known types commercially available. It is chosen to leave as little residue as possible on curing. Preferably the surfactant is an ester of sodium sulfosuccinic acid such as, for example, the dioctyl ester, which is sold commercially under the designation "Aerosol OT" (American Cyanamid Company, New York). Other types of anionic surfactants which may be employed include sodium salts of alkyl aryl sulfonates, such as those sold under the designation "Nacconol" (Allied Chemical Corp., New York) such as, for example $C_{12}H_{25}$—$C_6H_4$—$SO_3Na$; and sodium salts of sulfated alcohols, exemplified by sodium lauryl sulfate $C_{12}H_{25}OSO_3Na$, sold under various names such as "Gardinol," "Duponol," and the like.

The amount of surfactant required is not critical, and will generally lie in the range of about 0.0007 to about 0.08 part per 100 parts of water employed, said parts being by weight, and the surfactant being on the 100% solid basis.

The ester of a polyhydric alcohol is a water-miscible ester of ethylene glycol or of glycerol, with an organic carboxylic acid. Both diesters and triesters are contemplated. Thus, for example, there may be advantageously employed ethylene glycol diacetate, as well as the dipropionate and the dibutyrate. The preferred ester is ethylene glycol diacetate, a colorless liquid having approximately 10% water solubility. There may also be employed glyceryl diacetate (diacetin), and glyceryl tripropionate. The amount of ester will depend upon the desired film characteristics, but will generally lie between about 10 and 20 parts per 100 parts of water.

The water employed is advantageously distilled or deionized water, but even where water of this purity is employed, the contact of the sprayed dispersion will, on the surface of mild steel, produce some oxide formation. This may be minimized, and the alkalinity of the dispersion controlled, in accordance with the invention, by the inclusion of a water softener having an alkaline reaction, such as, for example, an alkali metal phosphate or carbonate. Suitable examples of water softeners include sodium hexametaphosphate, sodium metaphosphate, trisodium phosphate, and sodium tetraphosphate.

The preferred water softener is sodium hexametaphosphate, sold commercially under the designation "Calgon" (Calgon, Inc. Pittsburgh, Pa.). The amount employed may vary between about 0.05 and about 0.30 part per 100 parts of water present.

As indicated previously, the dispersion of the polymer, prior to application, as by spraying, is blended with a quantity of an organic water soluble diluent. The diluent is preferably a lower aliphatic alcohol which is more volatile than water, such as, for example, methanol, ethanol, isopropanol, and propanol. The amount of alcohol employed will generally lie between about 10 and about 50 parts per 100 parts of water present. The preferred alcohol is isopropanol.

Where the polymer dispersion is to be applied to the surface of an oxidizable metal such as steel, the surface is preconditioned and cleaned by sand or grit blasting.

The method of application of the polymer dispersion, in accordance with the invention, includes the steps of forming the dispersion, and spraying or otherwise applying the dispersion to the metal surface, which has been preconditioned by cleaning, and if desired, by precoating with a primer.

The metal temperature is maintained above about 50° F. in order to assure smooth deposition, and the temperature of the polymer dispersion is maintained between about 65° F. and 80° F. The dispersion is applied until the desired wet film thickness has been built up, measurements being taken with a wet film gauge, and depressions made by the gauge are filled and smoothed.

The thus coated wet film is then dried and cured by heating the metal to a temperature between about 400° F. and about 450° F. for about 30 to 90 minutes. At the end of the curing period, the metal is subjected to rapid cooling (quenching) to below about 200° F. within a limited period of time. Quenching imparts a glossy surface to the coating and tends to delay or retard crystallization, thus improving adhesion. Improper quenching results in a lack of adhesion and, consequently, an unsuccessful coating.

The dispersion of the invention may be applied by means of conventional air spraying techniques and equipment. The spray orifice size will be generally of the order of 0.05 inch. Thus, there may be employed a Binks No. 18 spray gun with a No. 66PE air cap, and a Binks No. 63B fluid nozzle, orifice size 0.046". A fluid pressure of about 20 p.s.i.g. and an atomizing pressure of about 30 p.s.i.g. are satisfactory and serve to exemplify the practice.

The following examples serve to illustrate the practice of the invention, but are not to be regarded as limiting:

Example 1.—Preparation of chlorinated polyether dispersion 750 grams of chlorinated polyether polymer (Penton) which were unpigmented, were ground to a fineness such that all passed through an 80 mesh sieve.

An aqueous solution was prepared having the composition:

Water _____ ml__ 750
Sodium hexametaphosphate (Calgon) _____ gm__ 1
Ethylene glycol diacetate _____ ml__ 75
Aerosol OT (100% solid) _____ gm__ 0.6

The Penton powder was gradually added to 600 ml. of this solution with vigorous stirring and a homogeneous dispersion was obtained. To the resulting dispersion were added with stirring 150 ml. of isopropyl alcohol, yielding a total volume of dispersion of approximately 750 ml. The dispersion thus obtained was ready for spray application.

Example 2.—Application of dispersion to tank car interior

The tank of a railway tank car was prepared for coating by first assuring that all welds were full, smooth and continuous and free from surface imperfections such as surface porosity, cracks, unfilled craters, overlaps, and sharp corners, burrs and edges. The tank was then heated for about 4 hours at a metal temperature of about 500° F. ±50° F. to remove oil and foreign matter by volatilization, in a suitable oven. Thereafter, the interior of the tank, including all the surfaces to be coated, was blast cleaned to white metal using a suitable abrasive, and thereafter the tank was thoroughly cleaned of blast residues.

Immediately following blast cleaning, and before any rust could form, there was applied a compatible modified phenolic resin primer (Metal and Thermit Corp. Coating B-124-17), care being taken to remove beforehand any traces of condensed moisture. The tank was maintained at about 50° F. or over during primer application. Weld seams, pitted areas and the like were prime coated first, allowed to dry, and then the general primer coat was applied. After ventilation to remove solvent and coating vapors, the primer was cured by conventional practice and inspected. The tank was now ready for Penton spraying.

The polymer dispersion prepared for spraying as described in Example 1 was sprayed with the Binks spray gun mentioned in column 4, lines 55-57, connected by a 3/8" inside diameter fluid hose and 5/16" inside diameter air hose to a pressure feed tank having a motor driven agitator. The temperature of the tank to be coated was maintained at 50° F. or higher and the dispersion temperature between 65° F. and 80° F. The dispersion was applied by cross-hatch spraying until an adequate wet film thickness had built up. Measurements of wet film thickness were made at intervals with a wet film gauge, and depressions made by the gauge were filled and smoothed. The wet film thickness of the coating averaged about 60 mils.

The wet film coating was cured by oven heating. The oven was first preheated, with the oven car for carrying the tank still in the oven. The oven burners were then shut off, the oven car drawn into the open, the coated tank mounted thereon, and the assembly moved back into the oven. The oven was then heated to maintain the tank at a temperature between 400° F. and 450° F. for a period of 75 minutes. No sagging, film degradation, discontinuities or bubbling were observed in the fused film after removal from the oven and quenching. The method of the invention has the advantage that additional coatings may be applied if desired to attain greater film thicknesses without any impairment of adhesion and other favorable properties.

At the end of the curing period, the tank was removed from the oven and rapidly quenched by a water spray applied to the exterior of the tank to cool it to below about 200° F., within a period of about 20 minutes after removal from the oven. When the exterior tank temperature was reduced to about 200° F., and the film was then below its softening temperature, water was sprayed directly on the film to complete the quenching. The quenching produced a glossy surface and retarded crystallization of the polymer.

What is claimed is:

1. Method of coating a surface with a chlorinated oxetane polymer layer which comprises maintaining the surface of the material to be coated above about 50° F., applying to said surface a coating composition comprising a dispersion of a finely divided chlorinated oxetane polymer in an aqueous medium including water, from about 0.0007 to about 0.08 part per 100 parts of water of a surfactant, an ester of a polyhydric alcohol with a lower aliphatic monocarboxylic acid in an amount between about 10 and about 20 parts per 100 parts of water, from about 0.05 to about 0.30 part per 100 parts of water of an alkaline water softener, and between about 10 and about 50 parts per 100 parts of water of a lower aliphatic alcohol which is more volatile than water, while maintaining said dispersion at a temperature between about 65° F. and about 80° F., until the desired wet coating thickness has been achieved, then drying and curing said coating at a temperature between about 400° F. and about 450° F., and quenching the coating to below the softening point of the polymer.

2. The method of claim 1 in which the dispersion is applied to the surface to be coated by spraying.

3. Method of coating the interior surface of a metal tank with a chlorinated oxetane polymer layer which comprises the steps of maintaining the interior surface of the metal at a temperature above about 50° F., spraying on said interior metal surface a dispersion of a finely divided chlorinated oxetane polymer in an aqueous medium including water, from about 0.0007 to about 0.08 part per 100 parts of water of a surfactant, an ester of a polyhydric alcohol with a lower aliphatic monocarboxylic acid in an amount between about 10 and about 20 parts per 100 parts of water, from about 0.05 to about 0.30 part per 100 parts of water of an alkaline water softener, and between about 10 and about 50 parts per 100 parts of water of a lower aliphatic alcohol which is more volatile than water, while maintaining said dispersion at a temperature between about 65° F. and about 80° F., until the desired wet coating thickness has been achieved, then drying and curing said coating by heating said tank to a temperature between about 400° F. and about 450° F., quenching the coating by applying a cooling medium to the exterior of the tank to bring it to a temperature below the softening point of the polymer, and thereafter further cooling the coating by applying said cooling medium directly to said coating.

4. The method of claim 3 in which the tank and coating are first cooled to below about 200° F.

5. The method of claim 3 in which a primer coat is first applied to the interior of the tank.

References Cited

UNITED STATES PATENTS

| 2,722,340 | 11/1955 | Feild | 117—161 |
| 2,872,438 | 2/1959 | Schroeder | 260—29.2 |
| 2,947,722 | 8/1960 | Boardman | 260—31.6 X |
| 3,061,566 | 10/1962 | Kass. | |
| 3,205,207 | 9/1965 | Vandenberg | 260—29.2 X |
| 3,242,115 | 3/1966 | McGary | 260—29.2 |

ALFRED L. LEAVITT, Primary Examiner.

A. GOLIAN, Assistant Examiner.

U.S. Cl. X.R.

117—49, 96, 104, 119.4, 132, 161